Figure 1:
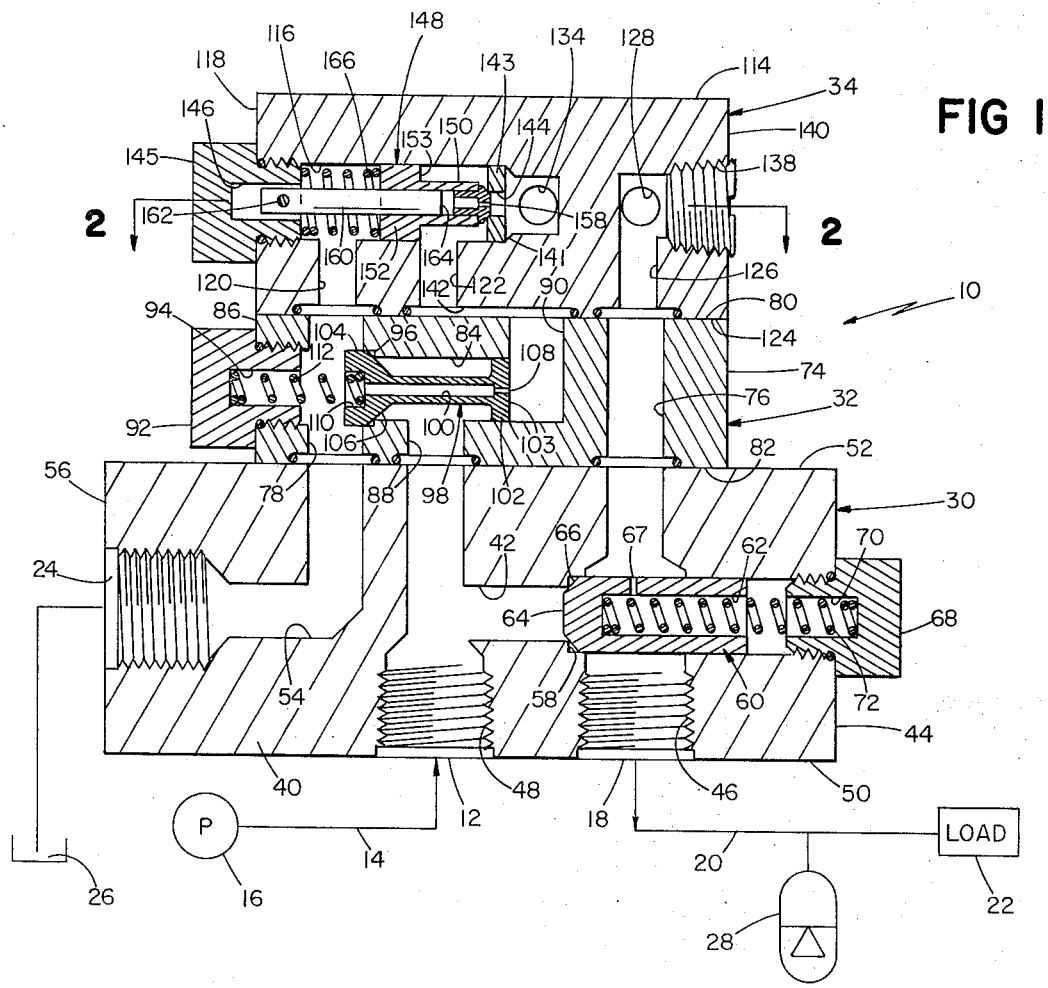

United States Patent [19]
Denker

[11] 3,788,339
[45] Jan. 29, 1974

[54] FLUID CONTROLLING
[75] Inventor: James M. Denker, Scituate, Mass.
[73] Assignee: Nutron Corporation, Hingham, Mass.
[22] Filed: Aug. 18, 1972
[21] Appl. No.: 281,966

Related U.S. Application Data
[63] Continuation-in-part of Ser. No. 230,561, March 1, 1972.

[52] U.S. Cl................ 137/115, 137/116, 137/119, 137/488
[51] Int. Cl............................................ G05d 16/10
[58] Field of Search... 137/115, 116, 119, 488, 491, 137/492, 492.5

[56] References Cited
UNITED STATES PATENTS
3,593,741 7/1971 Odenthal et al. ............... 137/491 X
3,587,619 6/1971 Krechel............................. 137/116
2,375,411 5/1945 Grant................................. 137/116
2,507,384 5/1950 Schneck............................ 137/116

*Primary Examiner*—William R. Cline

[57] ABSTRACT

A fluid control circuit comprising a controller including a control element movable between first and second positions and operative for generating an output fluid signal dependent on the position of the control element, and first and second sensors arranged for sensing a pilot pressure, one of the sensors being operable for causing the control element to assume its second position when the sensed pilot pressure exceeds a predetermined upper level, and the other of the sensors being operable for causing the control element to assume its first position when the pilot pressure drops below a predetermined lower level.

18 Claims, 2 Drawing Figures

PATENTED JAN 29 1974 3,788,339

FLUID CONTROLLING

This invention relates to fluid controls. This application is a continuation-in-part of my copending U.S. Pat. application Ser. No. 230,561, filed Mar. 1, 1972.

It is a principal object of the present invention to provide a simple and inexpensive fluid logic circuit that will discriminate between rising and falling pressure. Other objects include providing a modular unloading valve, preferably incorporating such circuitry, in which the unloading and reloading points are adjustable.

The invention features a fluid control circuit comprising a controller including a control element movable between first and second positions and operative for generating an output fluid signal dependent on the control element position, and first and second sensors arranged for sensing a pilot pressure, one of the sensors being operable for causing the control element to assume its second position when the pilot pressure exceeds a predetermined upper level, and the other of the sensors being operable for causing the control element to assume its first position when the pilot pressure drops below a predetermined lower level.

In preferred embodiments comprising a unloading valve including a plurality of interconnected valving modules and in which one of the sensors causes movement of the control element only in response to rising pressure and the other causes movement only in response to falling pressure, there is featured sensors comprising substantially identical modules each including an adjustable relief valve, a bypass flow module including a poppet spool for regulating flow between a fluid source and load, and a control module including the control element connected to the sensor and bypass modules for applying the fluid signals to an end of the spool.

Figure 2:
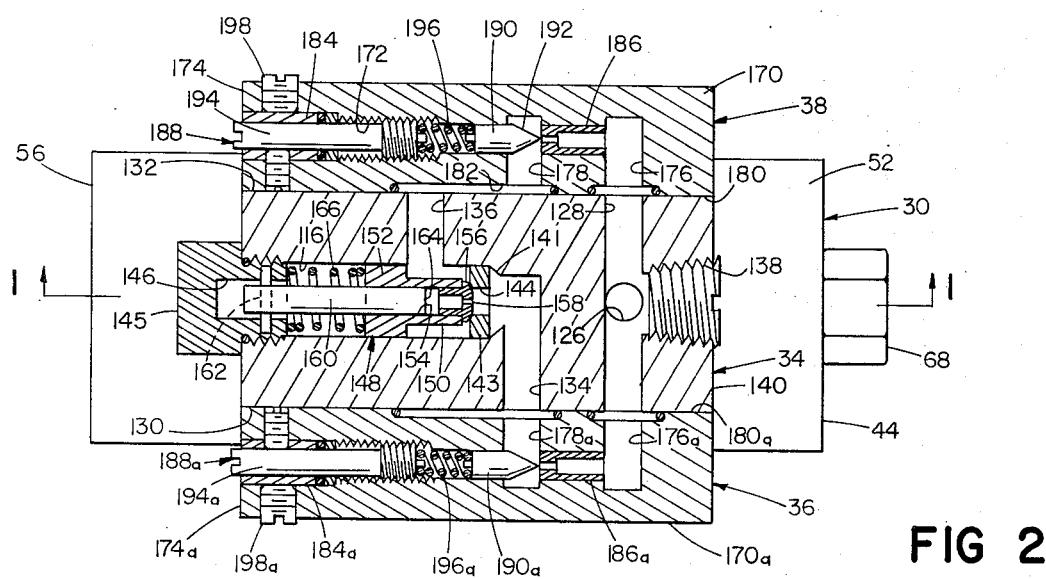

Other objects, features, and advantages will appear from the following detailed description of a preferred embodiment of the invention, taken together with the attached drawings in which:

FIG. 1 is a schematic view of a fluid circuit including a plan sectional view of an unloading valve embodying the present invention; and, FIG. 2 is a plan sectional view of the valve of FIG. 1 taken at 2—2 of FIG. 1.

Referring now to the drawings, there is shown an unloading valve, generally designated 10, whose main inlet 12 is connected by fluid line 14 to a constant flow, fixed displacement pump 16, whose main outlet 18 is connected by a fluid line 20 to a load 22, and whose drain outlet 24 is connected to a tank or reservoir 26. An accumulator 28 is connected to line 20 intermediate valve 10 and load 22.

As shown most clearly in FIG. 1, unloading valve 10 comprises five valve modules, designated 30, 32, 34, 36, and 38 respectively. Modules 30, 32, and 34 are stacked one on top of the other, modules 36, 38 are attached to opposite sides of module 34. The various modules are held together by hex-head bolts and the interfaces are sealed by O-rings.

Module 30 comprises a rectangular valve housing 40 in which there are provided four drilled bores or conduits, each extending inwardly from a side wall of housing 40. Bore 42 defines a valving chamber and extends inwardly from housing end wall 44. Bores 46, 48 extend through housing 40, from bottom wall 50 to top wall 52, axially intersecting bore 42. Bore 54 includes two intersecting relatively perpendicular drilled portions and extends from top wall 52 to end wall 56.

The portion of valve chamber bore 42 extending from bore 48 toward bore 46 is of smaller diameter than the rest of bore 42, thereby providing an annular step 58 in bore 42 on the side of bore 46 toward bore 48. A cylindrical check valve 60, having an interior bore 62 and closed at one end by a nose portion 64 having a chamfered annular rim 66, is slip-fitted within the larger diameter portion of bore 42 with the rim 66 of nose portion 64 adjacent and in position for seating over step 58. When the rim is seated on step 58, nose portion 64 closes bore 42 to prevent flow between bores 46 and 48. Check valve 60 also includes a damping orifice 67 extending radially through the side wall thereof from bore 62.

The end of bore 42 adjacent housing end wall 44 is closed by a threaded plug 68 having a cylindrical recess 70 of diameter equal to that of check valve bore 62 in its inner end. A helical compression spring 72 is mounted with its opposite ends within bore 62 of check valve 60 and recess 70 of plug 68, and urges check valve 60 towards its closed position.

Module 32 comprises a rectangular housing 74 including four drilled conduits extending inwardly from the side walls thereof. Conduits 76 and 78 extend between top surface 80 and bottom surface 82, and communicate and are in coaxial alignment with, respectively, conduits 46 and 54 (upper portion) of module 30. Conduit 84 defines a valving chamber and extends inwardly from end surface 86, axially intersecting conduit 78, approximately two-thirds the length of housing 74. Conduit 88 extends from bottom surface 82, intermediate conduits 76 and 78, to and axially intersects an intermediate portion of valving chamber conduit 84. Conduit 90 extends from the top surface 80 of housing 74 and axially intersects valving chamber conduit 84 adjacent the interior end thereof.

The exterior end of chamber conduit 84, adjacent end wall 86, is closed by a threaded plug 92 having a cylindrical recess 94 in the inner end thereof. The portion of conduit 84 extending from end wall 86 to slightly beyond conduit 78 is of larger diameter than the conduit portion extending coaxially therebeyond, providing an annular step 96 closely adjacent conduit 78 on the side thereof toward conduits 88 and 90.

A poppet spool 98 having a cylindrical bore 100 extending axially therethrough is slip-fitted within conduit 84. One end portion 102 of poppet spool 98 is closely slip-fitted within the smaller diameter portion of bore 84 intermediate intersecting bores 88 and 90. The other end portion 104 of poppet spool 98 is slip-fitted within the larger diameter portion of bore 84 closely adjacent annular step 96 and includes on the side thereof facing end portion 102 a conical, generally axially facing surface 106 arranged for seating over step 96. Bore 100 extending coaxially through spool 98 includes a small orifice 108 at spool end 102, and an increased diameter portion 110 defining an axially facing seat at spool end 104. A helical compression spring 112 is mounted with its opposite ends within recess 94 of plug 92 and bore portion 110 of spool 98, and urges spool surface 106 against annular seat 96.

The rectangular housing 114 of module 34 includes a valving chamber bore 116 extending inwardly from end surface 118, bores 120 and 122 extending from bottom surface 124 to and axially intersecting valving chamber bore 116; bore 126 extending from bottom surface 124 to midway the height of module 34; bore 128 extending between side surfaces 130, 132 and axially intersecting bore 126; bore 134 extending from side surface 130 to and axially intersecting chamber bore 116 at the inner end thereof; bore 136 extending from side surface 132 and axially intersecting chamber bore 116 adjacent bore 122; and tapped gage port bore 138 extending from end surface 140 to the intersection of bores 128 and 126. As shown, bores 120, 122, and 126 communicate, respectively, with bores 78, 90 and 76 of module 32. Bores 120, 124 are coaxially aligned with bores 78, 76 respectively. An elongated recess 142 is provided in side 124 of housing 114 overlying the end of conduit 122 and arranged also to overlie the end of conduit 98.

The major portion of valve chamber bore 116 is of slightly greater diameter than that closely adjacent and intersecting bore 134, providing an annular step 141. An annular valve seat 143 having a drilled orifice 144 extending therethrough coaxially with chamber bore 116 is seated on step 141, intermediate bores 136, 134. The end of chamber bore 116 adjacent end wall 118 is closed by a plug 145 having a coaxially cylindrical recess 146 in the inner end thereof.

A stepped-cylindrical poppet piston 148 having a smaller diameter portion 150 and larger diameter portion 152 joined by an axially facing surface 153 is closely slip-fitted within bore 116 with the smaller diameter portion 150 thereof adjacent valve seat 143 and the larger diameter portion 152 thereof intermediate bores 120, 122. A cylindrical bore 154 of diameter equal to that of orifice 144 extends coaxially through piston 148 and a piston nose 156 is fitted in the end of smaller diameter portion 150 in position for overlying and closing orifice 144 when piston 148 is seated against valve seat 142. A damping orifice 158 extends through nose 156. A cylindrical balance pin 160 one end of which is tightly slip-fitted within piston bore 154, extends axially of chamber bore 116 from within piston 148 to within recess 136 of plug 145, where it is fixed by a transverse pin 162. As illustrated, the length and position of pin 160 are such that an internal chamber 164 is provided within piston bore 154 between nose 156 and the adjacent end of pin 160. A helical compression spring 166 bears against the adjacent ends of plug 145 and piston major diameter portion 152, urging nose 156 against seat 142.

As previously mentioned, modules 36 and 38 are identical. Accordingly, only module 38 will be described herein in detail. In the drawings, each corresponding part of module 36 is identified by the same reference number used in describing module 38, though with a differentiating "a" added thereto.

Module 38 includes a rectangular housing 170 having main bore 172 extending longitudinally from end wall 174 substantially three-fourths the length thereof, and two transverse bores 176, 178 extending from side wall 180 and axially intersecting main bore 172. Transverse bore 176 is coaxial with and communicates with bore 128 of module 34. Communication between transverse bore 178 and bore 136 of module 34 is provided by an elongated recess 182 in side wall 180 overlying the end of bore 178 and arranged to overlie also the end of bore 136.

A valve, generally designated 188, is provided in main bore 172. As shown, valve 188 includes a valve seat 186 mounted intermediate bores 176, 178 with the minor diameter portion thereof adjacent bore 178, a poppet piston 190 slidably mounted in main bore 172 and having a conical head 192 adjacent and facing valve seat 186, a threaded axially adjustable body member 194 extending coaxially through a retaining sleeve 184 in the end of bore 172 adjacent end of bore 172 adjacent end wall 174, and a helical compression spring 196 between body member 194 and poppet piston 190 urging conical head 192 against valve seat 186. A locking screw 198 is provided for setting the position of body member 194 and thus the force with which poppet piston 190 is forced against seat 186.

With reference to module 36, it will be seen that its bore 176a and 178a are coaxially aligned with and in communication with bores 128, 134, respectively, of module 34.

In operation, fluid from pump 16 passes into module 30, opens check valve 60, and flows through line 20 to load 22 and accumulator 28. The fluid at the same pressure as that on load 22 and accumulator 28, hereafter referred to as load pressure, $P_L$, also passes through conduit 46 of module 30, conduit 76 of module 32, conduits 126 and 128 of module 34, and conduits 176 and 176a of modules 38 and 36 to act on poppet pistons 190, 190a.

Pressure relief valve 188 of module 38 acts as an unloading relief, and is set to open at a higher level than pressure relief valve 188a of module 36, which acts as a reloading relief.

As load pressure rises, it first reaches the setting of relief valve 188a. As the pressure continues to rise, poppet piston 190a is forced off seat 186a, admitting fluid into conduits 178a and 134 where it acts on the nose of poppet piston 148 and maintains a pressure that is equal to the load pressure, $P_L$, less the setpoint of relief valve 188a. If, for example, the relief valve setpoint is 500 psi, the pressure in conduits 178a and 134 will remain at zero until the load pressure reaches 500 psi, and will thereafter be equal to $P_L$–500 psi. It should be noted, as explained in detail in my copending U.S. Pat. application Ser. No. 230,561, that so long as piston 148 is seated on seat 141 there is no net force across the piston nose and the piston position is not affected by fluid pressure in conduits 178a, 134.

Pressure relief valve 188 in module 38 remains closed until $P_L$ reaches its set point, which for example may be 985 psi. When $P_L$ exceeds this set point, valve 188 opens, passing flow into conduits 178 and 136 at a pressure of $P_L$–985 psi. The fluid from conduit 136 acts on axial surface 153 of poppet piston 148 and, when the fluid pressure is sufficient to overcome the force of spring 166, for example 15 psi, lifts piston 148 off seat 141. Fluid from conduit 134, at pressure $P_L$–500, or some 485 psi greater than that in conduit 136, now flows through orifice 144 into bore 116, and then through bores 122 and 90 to act on smaller diameter end 102 of poppet spool 98 of module 32. The force exerted by spring 112 on spool 98 is quite small and will be overcome by about 10 psi force. The pressure of fluid from conduit 90 drives the spool to the left (as seen in FIG. 1), lifting spool sealing surface 106 off seat 96 and diverting pump flow from source 16 and inlet 12 through conduits 48, 84, 78 and 54 to reservoir 26.

This flow diversion drops the pressure in bore 48 to atmospheric pressure, far below $P_L$, and causes check valve 60 to close. Load 22 is now driven by fluid in accumulator 28, and the load pressure continuously drops. When $P_L$, which as previously noted continues to act on pressure relief valves 188, 188a, drops below the set point (985 psi in the example previously given) of unloading relief valve 188 of module 38, poppet piston 190 of valve 188 closes against seat 186. Reloading valve 188a closes when $P_L$ drops below its set point, 500 psi in the example previously given.

Poppet piston 148 of module 34 remains open as long as the fluid acting against it remains above the pressure required to overcome the bias of spring 166 (in the example given, about 15 psi). As the pressure of this fluid is determined by reloading valve 188a, and is equal to $P_L$–500 psi (the set point of valve 162a), poppet piston 148 starts to close when $P_L$ drops to about 515 psi and completely closes by the time $P_L$ reaches 500 psi, at which time reloading valve 188a closes and the pressure in conduits 134, 178a drops to zero.

The closure of poppet piston 148 cuts off flow through module 34 to poppet spool 98 of module 32, the pressure of fluid acting on smaller diameter end 102 of spool 98 drops to zero, and spring 112 closes spool larger diameter end 104 over seat 96.

Flow from source 16 through valve 10 to reservoir 26 is now cut off, the pressure in conduit 38 immediately builds up thereby opening check valve 60, and the cycle repeats.

It will be noted that the load pressure at which fluid from source 16 is diverted to reservoir 26 depends on the setting of adjustable unloading relief valve 188; and the pressure at which inlet flow is again directed through valve 10 to load 22 is controlled by the set point of adjustable reloading relief valve 188a. Both the unloading and reloading points are adjustable, and they may be set as close as about 15 psi of each other, if desired. The instability range of unloading valve 10, determined by the pressure exerted by spring 112 which is required to overcome the force tending to hold poppet spool open (caused by flow from conduits 88 past lip 96 to conduit 78) when the pressure of fluid from conduit 90 on end 103 of the spool has been dropped to zero, is less than 10 psi.

Other embodiments within the scope of the following claims will occur to those skilled in the art.

What is claimed is:

1. A fluid control circuit comprising:
    a controller including a control element movable between first and second positions and operative for generating a fluid output signal dependent on the position of said element;
    a first pressure sensor connected to said controller and comprising a first valve body having a first pressure relief valve disposed therein for controlling flow from an inlet thereof to an outlet thereof; and,
    a second pressure sensor connected to said controller and comprising a second valve body having a second pressure relief valve disposed therein for controlling fluid from an inlet thereof to an outlet thereof,
    each of said inlets being adapted for connection to a source of pilot fluid to sense the pressure thereof,
    said controller including a third valve body having said control element disposed therein, a first control inlet connected to said outlet of said first valve body, a second control inlet connected to said outlet of said second valve body, and an outlet,
    said first sensor being operable for causing said control element to assume its second position when the sensed pilot fluid pressure exceeds a predetermined upper level, and
    said second sensor being operable for causing said control element to assume its first position when said sensed pilot fluid pressure is less than a predetermined lower level.

2. The fluid control circuit of claim 1 wherein at least one of said sensors is adjustable for varying the respective one of said first and second predetermined levels.

3. The fluid control circuit of claim 1 wherein said control element prevents flow through said third valve body from said one inlet to said outlet thereof in said first position thereof, permits said flow from said one inlet to said outlet in said second position thereof, and permits flow through said third valve body from said another inlet to said outlet in both said first and second position thereof.

4. The fluid control circuit of claim 3 wherein said controller is arranged such that when said control element is in said first position thereof flow of fluid from said second sensor to said controller is ineffective to cause movement of said control element to said second position thereof.

5. The fluid control circuit of claim 4 wherein said controller is arranged such that flow of fluid from said first sensor to said controller is effective to cause said control element to assume said second position thereof.

6. The fluid control circuit of claim 4 wherein said controller is arranged such that when said control element is in said second position thereof flow of fluid from said second sensor to said controller is effective to maintain said control element in said second position thereof.

7. The fluid control circuit of claim 3 wherein said control element is biased towards said first position thereof.

8. The fluid control circuit of claim 3 including a fourth valve body having a control inlet connected to said third valve body outlet, a main flow inlet, an outlet, and a bypass valve disposed therein for controlling flow therethrough between said main flow inlet and said outlet and responsive to flow from said control inlet.

9. The fluid control circuit of claim 3 wherein said bypass valve comprises a poppet spool movable between a closed position preventing said flow therethrough and an open position permitting said flow therethrough and is biased towards said closed position, one end of said spool defining a control surface arranged such that fluid from said controller applied to said control surface tends to move said spool into its open position.

10. The fluid control circuit of claim 1 including a plurality of interconnected valving modules;
    a first one of said modules comprising said first sensor;
    a second one of said modules comprising said second sensor;
    a third one of said modules comprising said controller, and being arranged such that said control element prevents flow from said second control inlet to said outlet in said first position thereof, permits said flow from said second control inlet to said outlet in said second position thereof, and permits flow from said first control inlet to said outlet in said first and second positions thereof; and, a fourth one of said modules including a control inlet connected to said outlet of said third one module, a main flow inlet and a main flow outlet, and having a bypass flow element disposed therein arranged for controlling flow between said main flow inlet and said main flow outlet, said controller being further arranged such that flow from said second sensor to said controller when said control element is in said first position is ineffective to cause movement of said control element to said second position thereof, said flow from said second sensor when said control element is in said second position thereof is effective to maintain said control element in said second position thereof, and flow from said first sensor to said controller is effective to cause said control element to assume said second position thereof, and said bypass flow element comprising a poppet spool movable between a closed position preventing flow from said main inlet to said main flow outlet and an open position permitting said flow from said main inlet to said main outlet, said spool being biased towards its closed position and one end of said spool defining a control surface arranged such that fluid from said controller to said control inlet applied to said control surface tends to move said spool into its open position.

11. The fluid control circuit of claim 10 wherein a fifth one of said modules includes a main flow inlet conduit having an inlet adapted to be connected to a source of fluid, an outlet adapted to be connected to a load, a check valve disposed therein and biased towards its closed pposition for controlling flow therethrough, a first bypass flow conduit connecting the upstream side of said check valve in said main flow conduit to said main flow inlet of said fourth one module, a second bypass flow conduit extending from a bypass flow outlet of said fifth one module to said main flow outlet of said fourth one module, and a pilot pressure conduit extending from the downstream side of said check valve in said main flow conduit to a pilot outlet, and wherein said circuitry further includes means connecting the inlets of each of said first one and second one modules to said pilot outlet of said fifth one module.

12. A fluid control circuit comprising:

a controller including a control element movable between first and second positions and operative for generating a fluid output signal dependent on the position of said element;

a first pressure sensor connected to said controller and adapted for connection to a source of pilot fluid to sense the pressure thereof; and, a second pressure sensor connected to said controller and adapted for connection to said source to sense the pressure of said pilot fluid, said first sensor being operable for causing said control element to assume its second position when the sensed pilot fluid pressure exceeds a predetermined upper level, and for passing fluid from said pilot source to said controller along a first path when said sensed fluid pressure exceeds said upper level and for preventing flow along said first path when said sensed fluid pressure is less than said upper level, and said second sensor being operable for causing said control element to assume its first position when said sensed pilot fluid pressure is less than a predetermined lower level, and for passing flow from said source to said controller along a second path when said sensed fluid pressure exceeds said lower level and for preventing flow along said second path when said sensed fluid pressure is less than said lower level.

13. The fluid control circuit of claim 12 wherein when said control element is in said first position said controller and sensors are operative to cause said control element to remain in said first position when said sensed pressure is intermediate said upper and lower levels.

14. The fluid control circuit of claim 12 wherein when said control element is in said second position said controller and sensors are operative to cause said control element to remain in said second position when said sensed pressure is intermediate said upper and lower levels.

15. The fluid control circuit of claim 12 wherein said control element is biased towards said first position thereof and is operative to prevent flow of fluid through said controller from said second sensor in said first position thereof.

16. The fluid control circuit of claim 12 including a valve body having a bypass flow valve disposed therein, a control inlet connected to said controller, a main inlet for connection to a fluid source, and an outlet, said bypass flow valve being movable between a closed position preventing flow from said main inlet through said valve body to said outlet and an open position permitting said flow through said valve body, and said controller being operative to move said bypass flow valve into the open position thereof in response to movement of said control element into said second position thereof.

17. The fluid control circuit of claim 16 wherein said bypass flow valve is biased towards said closed position thereof.

18. The fluid control circuit of claim 16 wherein each of said sensors is adjustable for varying the respective one of said upper and lower predetermined levels.

* * * * *